(12) United States Patent
Lee et al.

(10) Patent No.: US 11,415,734 B2
(45) Date of Patent: Aug. 16, 2022

(54) METHOD OF DERIVING APPROPRIATE CUTTING CONDITIONS FOR CUTTING POLARIZING PLATE

(71) Applicant: LG CHEM, LTD., Seoul (KR)

(72) Inventors: Moon Chan Lee, Daejeon (KR); Jeong Ho Park, Daejeon (KR); Jin Soo Lee, Daejeon (KR); Bu Gon Shin, Daejeon (KR)

(73) Assignee: SHANJIN OPTOELECTRONICS (SUZHOU) CO., LTD., Jiangsu (CN)

( * ) Notice: Subject to any disclaimer, the term of this patent is extended or adjusted under 35 U.S.C. 154(b) by 248 days.

(21) Appl. No.: 16/958,946

(22) PCT Filed: Jun. 21, 2019

(86) PCT No.: PCT/KR2019/007472
§ 371 (c)(1),
(2) Date: Jun. 29, 2020

(87) PCT Pub. No.: WO2019/245312
PCT Pub. Date: Dec. 26, 2019

(65) Prior Publication Data
US 2020/0341177 A1 Oct. 29, 2020

(30) Foreign Application Priority Data
Jun. 22, 2018 (KR) .................. 10-2018-0072251

(51) Int. Cl.
*G02B 5/30* (2006.01)
*B29D 11/00* (2006.01)
*B26D 1/00* (2006.01)

(52) U.S. Cl.
CPC ............. *G02B 5/3033* (2013.01); *B26D 1/00* (2013.01); *B29D 11/00644* (2013.01); *B29D 11/00951* (2013.01); *G02B 5/30* (2013.01); *B29D 11/00932* (2013.01)

(58) Field of Classification Search
CPC ........ B29D 11/00951; B29D 11/00644; B29D 11/00; G02B 5/3033; G02B 5/30
See application file for complete search history.

(56) References Cited

U.S. PATENT DOCUMENTS 6,800,366 B2  10/2004  Chang et al.
10,052,830 B2  8/2018  Kim et al.

FOREIGN PATENT DOCUMENTS

| EP | 3059620 A1 | 8/2016 |
| JP | 2004-516359 A | 6/2004 |
| JP | 2009220285 A | 10/2009 |
| KR | 10-2015-0066773 A | 6/2015 |
| KR | 10-2016-0020867 A | 2/2016 |

(Continued)

*Primary Examiner* — Mathieu D Vargot
(74) *Attorney, Agent, or Firm* — Dentons US LLP (57) ABSTRACT

A method of deriving an appropriate condition for cutting a polarizing plate, the method including: (a) preparing a polarizing plate including an adhesive layer and having a cut surface; (b) providing the polarizing plate so that one end of the polarizing plate adjoins a guide unit; (c) moving the polarizing plate on the guide unit; (d) measuring frictional force applied between the polarizing plate and the guide unit while moving the polarizing plate; and (e) deriving the appropriate condition for cutting the polarizing plate based on the measured value of the frictional force and a predetermined adhesive agent leakage determination criterion based on the frictional force.

7 Claims, 11 Drawing Sheets

(56) References Cited

FOREIGN PATENT DOCUMENTS

| KR | 10-2017-0054403 A | 5/2017 |
|---|---|---|
| WO | 0250209 A1 | 6/2002 |
| WO | 2016/039296 A1 | 3/2016 |

METHOD OF DERIVING APPROPRIATE CUTTING CONDITIONS FOR CUTTING POLARIZING PLATE

CROSS-REFERENCE TO RELATED APPLICATIONS

This is a U.S. national stage of international Application No. PCT/KR2019/007472 filed Jun. 21, 2019, and claims priority to and the benefits of Korean Patent Application No. 10-2018-0072251, filed with the Korean Intellectual Property Office on Jun. 22, 2018, the entire contents of which are incorporated herein by reference

TECHNICAL FIELD

The present invention relates to a method of deriving a condition for appropriately cutting a polarizing plate, and more particularly, to a method of deriving a condition for appropriately cutting a polarizing plate based on an adhesive agent leakage determination criterion.

BACKGROUND

A polarizing plate is configured to implement a desired image by polarizing light, which vibrates in all directions, so that the light vibrates only in a particular direction. The polarizing plates are attached to both sides of a liquid crystal display (LCD) panel.

Figure 1:
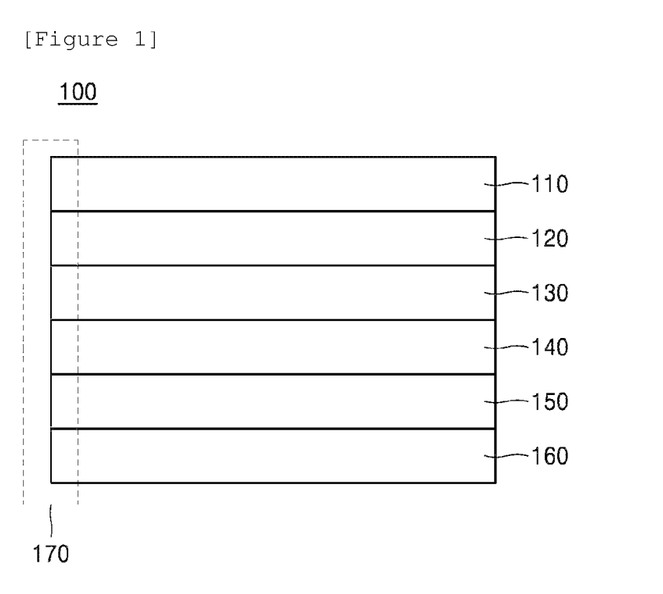
FIG. 1 is a cross-sectional view illustrating a general layered structure of a polarizing plate.

As illustrated in FIG. 1, a polarizing plate 100 has a layered structure that includes a polarizer layer 130 made of a PVA material, upper and lower support layers 120 and 140 attached to two surfaces of the polarizer layer 130, a protective film layer 110 formed on an upper portion of the upper support layer 120 and configured to protect the polarizer layer 130 from an external environment such as temperature or humidity, an adhesive layer 150 formed on a lower portion of the lower support layer 140, and a release film layer 160 formed on a lower portion of the adhesive layer 150 and configured to protect the adhesive layer 150.

Figure 2:
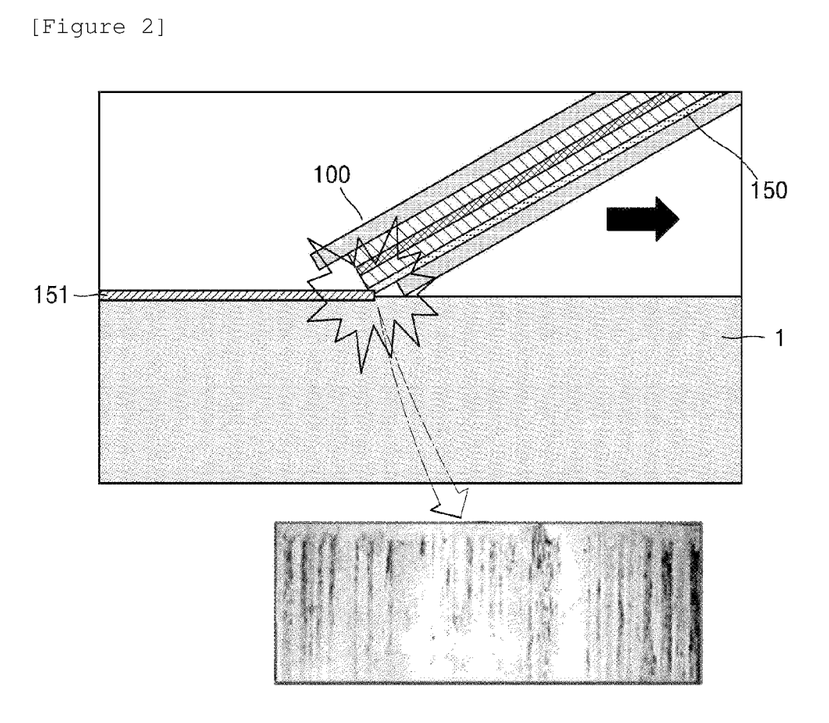
FIG. 2 is a schematic representation of an adhesive agent leaking onto a transport facility.

The polarizing plate 100 is mass-produced at a production site line and cut into a size corresponding to a size of a product to which the polarizing plate is to be applied, and then the polarizing plate 100 is attached to the panel. As illustrated in FIG. 2, an adhesive agent 151 may leak from the adhesive layer 150 during a process of cutting the polarizing plate 100 and a process of transporting the polarizing plate 100 along a transport facility 1. In particular, in the case of the large-sized polarizing plate 100 used for a TV panel, when multiple polarizing plates 100 are stacked and then stored or transported, an excessive load is applied to the polarizing plate 100 positioned toward the bottom of the stacked polarizing plates, and as a result, a problem of a leakage of the adhesive agent 151 becomes more severe.

The large amount of adhesive agent 151 does not leak at once from the polarizing plate 100 during the process of cutting or transporting the polarizing plate 100 having the adhesive layer 150 with a thickness of about 20 μm. However, because it is difficult to change the position of the transport facility 1 once the transport facility 1 is fixedly installed, a leakage of only a small amount of adhesive agent 151 onto the transport facility 1 causes the polarizing plate 100 to not be disposed at an accurate position intended for an attachment process or a cleaning process, thereby causing a defect in a product.

In the related art, a hard adhesive agent, made by changing a composition ratio of segments included in the adhesive agent, is sometimes used to reduce a degree of leakage of the adhesive agent, but in this case, there occurs a problem of a deterioration in adhesion caused by an increase in a bulk modulus or a problem of durability degradation.

Meanwhile, the degree of leakage of the adhesive agent may vary depending on not only the change in the components of the adhesive agent, but also a shape of a cut surface (e.g., a taper angle) of the polarizing plate or a size of a curl caused by bending or sagging of the polarizing plate.

SUMMARY

The present invention has been made in an effort to solve the above-mentioned problems, and an object of the present invention is to provide a method of deriving a condition for appropriately cutting a polarizing plate based on an adhesive agent leakage determination criterion set in advance to information about data of frictional force applied between a polarizing plate and a guide unit.

A method of deriving a condition for appropriately cutting a polarizing plate according to an exemplary embodiment of the present invention may include: (a) preparing a polarizing plate including an adhesive layer and having a cut surface formed by being cut based on any cutting condition; (b) providing the polarizing plate so that one end of the polarizing plate adjoins a guide unit; (c) moving the polarizing plate on the guide unit; (d) measuring frictional force applied between the polarizing plate and the guide unit while moving the polarizing plate; and (e) deriving a condition for appropriately cutting the polarizing plate based on the measured value of the frictional force and an adhesive agent leakage determination criterion set in advance to information about data of the frictional force.

In an exemplary embodiment, the cutting condition may include a condition of a cutting angle formed between one of two surfaces of the polarizing plate and the cut surface of the polarizing plate.

In an exemplary embodiment, step (b) may include adjusting a size of a curl formed at one end of the polarizing plate.

In an exemplary embodiment, a protective film layer may be positioned on one of two surfaces of the polarizing plate, and a release film layer may be positioned on the other of the two surfaces of the polarizing plate.

In an exemplary embodiment, step (c) may move the polarizing plate in a first direction toward which one of two surfaces of the polarizing plate is directed or a second direction toward which the other of the two surfaces of the polarizing plate is directed.

In an exemplary embodiment, step (e) may include calculating a difference between a value of the frictional force measured when the polarizing plate moves in the first direction and a value of the frictional force measured when the polarizing plate moves in the second direction and comparing the difference with the determination criterion.

In an exemplary embodiment, step (e) may derive the condition for appropriately cutting the polarizing plate from the any cutting condition when based on the calculated difference between the values of the frictional force and the determination criterion, it is determined that the adhesive agent does not leak from the polarizing plate.

According to the method of deriving a condition for appropriately cutting a polarizing plate according to an exemplary embodiment of the present invention, a polarizing plate cutting manner and a shape of a cut surface are adjusted based on the adhesive agent leakage determination criterion set in advance to information about data of fric-

DETAILED DESCRIPTION

Hereinafter, the present invention will be described in detail with reference to the accompanying drawings.

Figure 3:
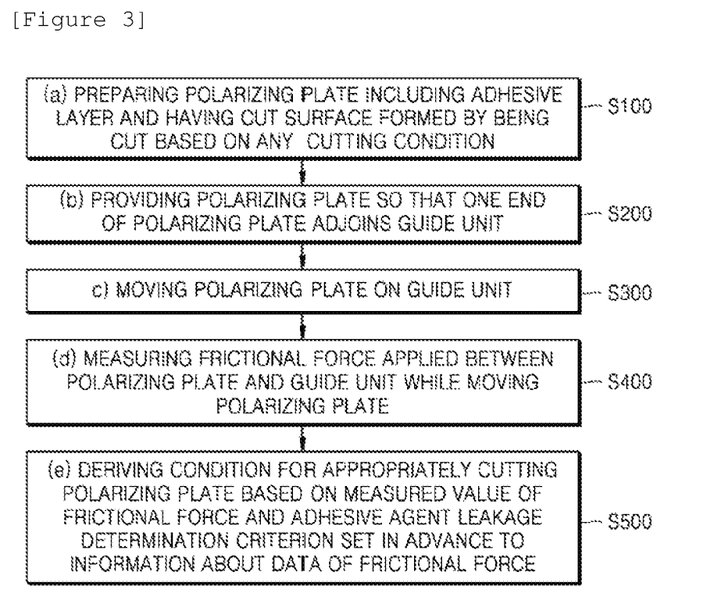
FIG. 3 is a flowchart illustrating a method of deriving a condition for appropriately cutting a polarizing plate according to the present invention.
Figure 4:
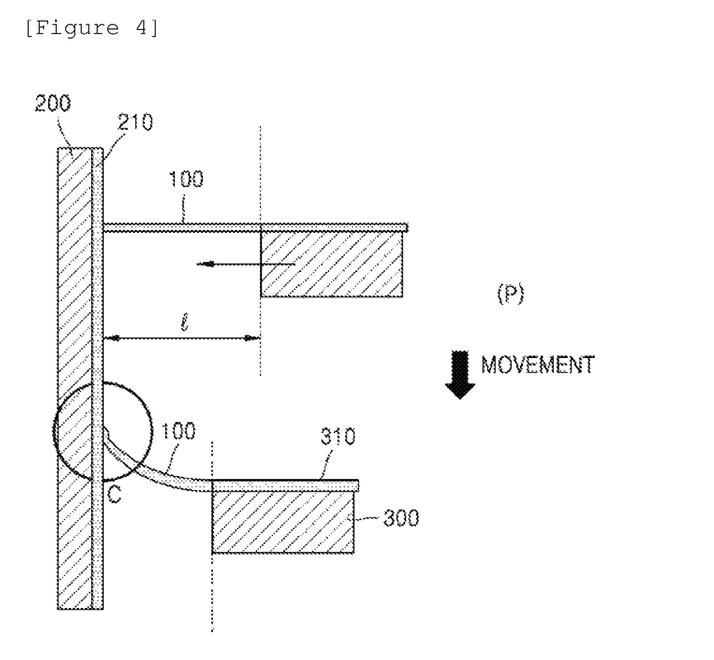
FIG. 4 is a schematic illustration of an experimental device according to the present invention which is made by modeling a movement of the polarizing plate to derive the condition for appropriately cutting the polarizing plate.

FIG. 3 is a flowchart illustrating a method of deriving a condition for appropriately cutting a polarizing plate according to the present invention, and FIG. 4 is a view illustrating an experimental device according to the present invention which is made by modeling a movement of the polarizing plate to derive the condition for appropriately cutting the polarizing plate.

The present invention relates to a method of deriving a condition for appropriately cutting a polarizing plate based on a determination criterion in respect to a leakage of an adhesive agent 151 which is set in advance to information based on frictional force applied between a polarizing plate 100 and a guide unit 200. Referring to FIG. 3, the method may include (a) preparing the polarizing plate 100 including an adhesive layer 150 and having a cut surface 170 formed by using any cutting condition (S100), (b) providing the polarizing plate 100 so that one end of the polarizing plate 100 adjoins the guide unit 200 (S200), (c) moving the polarizing plate 100 on the guide unit 200 (S300), (d) measuring frictional force applied between the polarizing plate 100 and the guide unit 200 while moving the polarizing plate 100 (S400), and (e) deriving a condition for appropriately cutting the polarizing plate 100 based on the measured value of the frictional force and the determination criterion with respect to the leakage of the adhesive agent 151 which is set in advance based on the frictional force (S500).

In the exemplary embodiment of the present invention, an experiment for deriving the condition for appropriately cutting the polarizing plate was performed by using an experimental device illustrated in FIG. 4, and an experiment for deriving the adhesive agent leakage determination criterion was also performed by using the experimental device illustrated in FIG. 4.

The experimental device illustrated in FIG. 4 models an actual movement of the polarizing plate 100 on a transport facility 1 and may include the polarizing plate 100, the guide unit 200, and a polarizing plate providing unit 300 that provides the polarizing plate 100 to the guide unit 200.

As illustrated in FIG. 4, glass 210 may be formed on one surface of the guide unit 200, and one end of the polarizing plate 100 may be provided on the glass 210 of the guide unit 200. The polarizing plate providing unit 300 may include a clamp 310 that supports the other end of the polarizing plate 100. The polarizing plate providing unit 300 may be provided to be spaced apart from the guide unit 200 at a predetermined interval l and moved in a vertical direction or a horizontal direction. Hereinafter, a vertical movement of the polarizing plate providing unit 300 means a movement in an up/down direction, and a horizontal movement of the polarizing plate providing unit 300 means a movement in a left/right direction.

Meanwhile, the guide unit 200 and the polarizing plate providing unit 300 may be provided to be spaced apart from each other at the interval l equal to or greater than a length of the polarizing plate 100.

Hereinafter, the method of deriving the condition for appropriately cutting the polarizing plate according to the exemplary embodiment of the present invention will be described in more detail.

Step (a): Preparing a polarizing plate including an adhesive layer and having a cut surface formed by being cut using any cutting condition (S100)

Step (a) is a step of preparing the polarizing plate 100 including the adhesive layer 150 and having the cut surface 170 formed by being cut using any cutting condition.

In this step, the polarizing plate 100 having the structure as illustrated in FIG. 1 may be prepared.

The polarizing plate 100 may be prepared to have a size suitable for a standard display. In an exemplary embodiment, the polarizing plate 100 having a standard of 1.8 cm in length×1.0 cm in width was prepared by applying a ratio (143.97 cm in length×80.90 cm in width) of a standard 65-inch display panel to perform the experiment.

The specifications of the polarizing plate 100 used for the experiment performed in the present invention are shown in Table 1.

TABLE 1

| Polarizing plate 100: 1.8 cm × 1 cm (length × width) | |
|---|---|
| Overall thickness (unit: μm) | 154 ± 20 |
| Protective film layer (PET) | 70 |
| Upper support layer (TAC) | 64 |
| Polarizer layer (PVA) | 25 |
| Lower support layer (Acryl) | 40 |

TABLE 1-continued

Polarizing plate 100: 1.8 cm × 1 cm (length × width)

| Adhesive layer (PSA) | 25 ± 5 |
|---|---|
| Release film layer (PET) | 40 |

Figure 6:
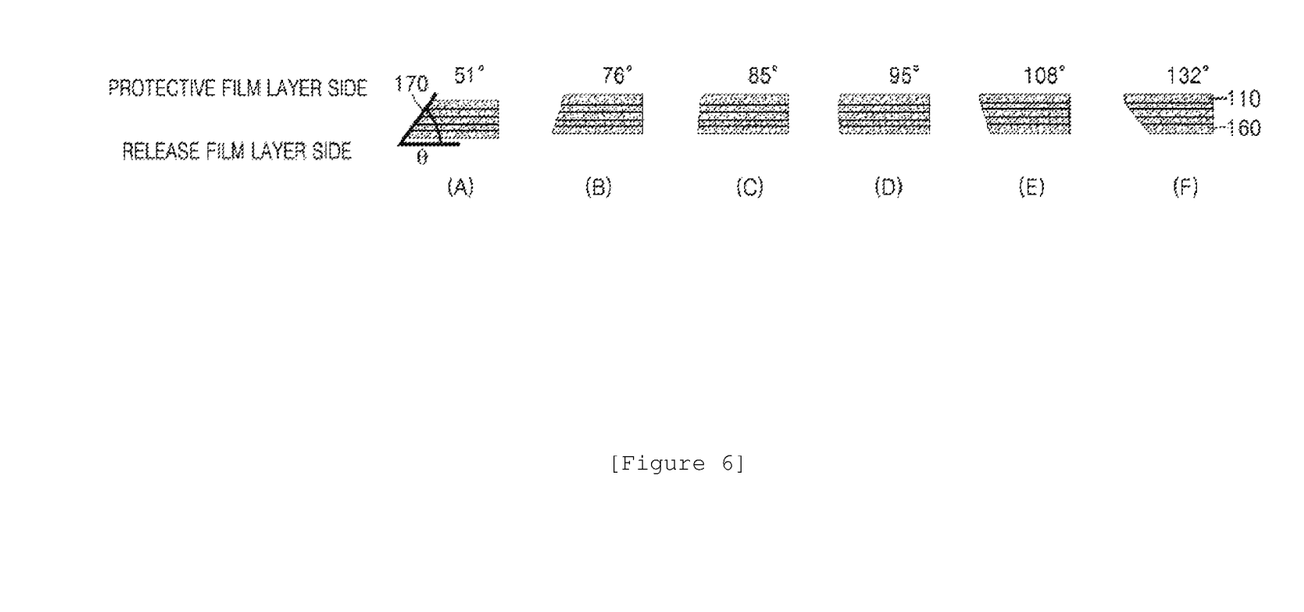
FIG. 6 illustrates various shapes of cut surfaces of the polarizing plate provided for experiments according to the present invention.

In Table 1, the thickness of an upper support layer (TAC) includes the thickness of a functional coating layer (ASG5), and in this experiment, a polarizing plate including an upper support layer (TAC) having a thickness of 60 μm and a functional coating layer having a thickness of 4 μm was used. The prepared polarizing plate 100 has the cut surface 170 formed by being cut using any cutting condition. For example, as illustrated in FIG. 6, the cut surface 170 may have one of various shapes (hereinafter, referred to as 'taper angles θ').

The taper angle θ is used to determine the shape of the cut surface 170 of the polarizing plate 100 and means an angle formed between any one of two surfaces of the polarizing plate 100 and the cut surface 170 of the polarizing plate 100. Here, one of the two surfaces of the polarizing plate 100 may be a protective film layer 110 or a release film layer 160. In the present specification, the taper angle θ is defined as meaning an angle formed between the cut surface 170 of the polarizing plate 100 and the release film layer 160 which is one of the two surfaces of the polarizing plate 100, but is not limited thereto.

Meanwhile, in the present invention, any cutting condition may mean a laser irradiation direction and a laser irradiation angle that determine the taper angle θ.

The laser irradiation may be performed from one of two surfaces of the polarizing plate 100 to the other of the two surfaces of the polarizing plate 100 to cut the polarizing plate 100. Specifically, in the present exemplary embodiment, in a case in which the laser irradiation is performed in a direction from the protective film layer 110 to the release film layer 160 of the polarizing plate 100, the taper angle θ may be 90° or less, and the polarizing plates 100 may be formed as illustrated in FIGS. 6A, 6B, and 6C. In contrast, in a case in which the laser irradiation is performed in a direction from the release film layer 160 to the protective film layer 110 of the polarizing plate 100, the taper angle θ may be 90° or more, and the polarizing plates 100 may be formed as illustrated in FIGS. 6D, 6E, and 6F. Meanwhile, the taper angle θ may be adjusted by varying the laser irradiation angle.

In addition, in the present invention, any cutting condition may mean intensity of an auxiliary gas or intensity of a lower end suction pressure that adjusts a thickness of the adhesive layer 150. The intensity of the auxiliary gas or the intensity of the lower end suction pressure may adjust the thickness of the adhesive layer 150 of the polarizing plate 100 exposed through the cut surface 170 when cutting the polarizing plate 100.

Figure 9A:
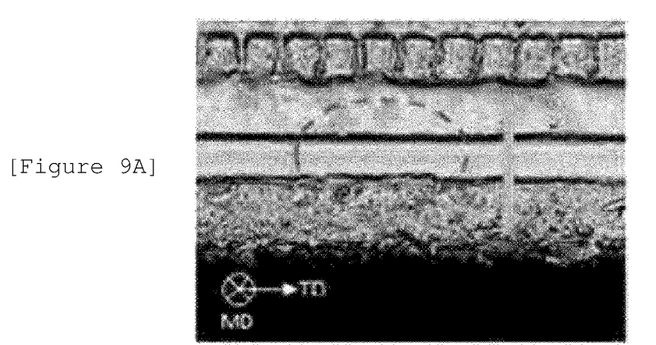
FIGS. 9A to 9C are scanning electron microscope (SEM) images showing thicknesses of adhesive layers of the polarizing plates exposed through cut surfaces with respect to an auxiliary gas and a lower end suction pressure.
Figure 9B:
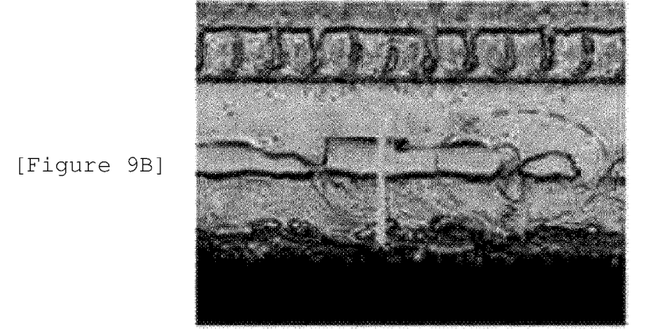
Figure 9C:
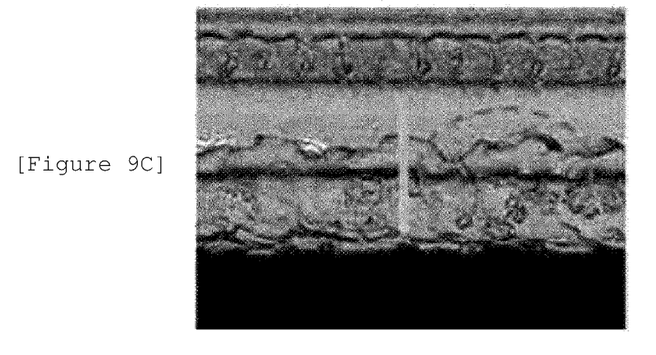

FIGS. 9A to 9C are SEM images showing the thicknesses of the adhesive layers of the polarizing plates exposed through cut surfaces with respect to the auxiliary gas and the lower end suction pressure. In this experiment, $N_2$ was used as the auxiliary gas, and the auxiliary gas and the lower end suction pressure was increased from FIGS. 9A to 9C. It can be seen from FIGS. 9A to 9C that the thickness of the adhesive layer 150 of the polarizing plate 100 exposed through the cut surface 170 decreases as the auxiliary gas or the lower end suction pressure is increased when cutting the polarizing plate 100.

Step (b): Providing a polarizing plate so that one end of polarizing plate adjoins guide unit (S200)

Step (b) is a step of providing the polarizing plate 100 so that one end of the prepared polarizing plate 100 adjoins the guide unit 200, and the polarizing plate providing unit 300 is moved toward the guide unit 200 to provide the polarizing plate 100 so that one end of the polarizing plate 100 adjoins the guide unit 200. In this case, one end of the polarizing plate 100 provided to the guide unit 200 may be the cut surface 170 of the polarizing plate 100, and the other end of the polarizing plate 100 may be fixed to the clamp 310.

The angle formed between the polarizing plate and the guide unit (hereinafter, referred to as a 'size (c) of the curl') varies, based on a position of the clamp to which the other end of the polarizing plate is fixed, when the polarizing plate 100 is actually provided to the guide unit in a facility, and degrees to which the two surfaces of the polarizing plate 100 are pushed to separate from each other depending on the size (c) of the curl, which affects whether the adhesive agent leaks and/or the degree of leakage of the adhesive agent. Here, the size (c) of the curl is defined as an angle formed between a contact surface on the guide unit 200 and a predetermined region which includes one end of the polarizing plate 100 and may be considered as a straight section from one end of the polarizing plate 100.

Therefore, this step may include modeling a situation when the polarizing plate is transported and adjusting the size (c) of the curl formed at one end of the polarizing plate 100 that may cause leakage of the adhesive agent 151. In an exemplary embodiment of the present invention, the polarizing plate 100 is provided to the guide unit 200 while the size (c) of the curl formed at one end of the polarizing plate 100 is adjusted to 15°, 30°, and 50°. The cutting condition for minimizing leakage of the adhesive agent 151 may vary depending on the size (c) of the curl.

Step (c): Moving polarizing plate on guide unit (S300)

Step (c) is a step of moving the polarizing plate on the guide unit. After the polarizing plate 100 is provided so that one end of the polarizing plate 100 adjoins the guide unit 200, the polarizing plate providing unit 300 is moved in a vertical direction, such that the polarizing plate 100 is moved on the guide unit 200 in a first direction toward which any one of the two surfaces of the polarizing plate 100 is directed or a second direction toward which the other of the two surfaces of the polarizing plate 100 is directed. In this experiment, the polarizing plate providing unit 300 is set to move the polarizing plate 100 on the guide unit 200 at a speed of 300 mm/min.

In an exemplary embodiment of the present invention, the movement direction of the polarizing plate 100 may be determined depending on the type of one surface of the polarizing plate 100 that faces the guide unit 200. In the exemplary embodiment of the present invention, the first direction means a direction in which the release film layer 160 of the polarizing plate 100 faces the guide unit 200, and the second direction means a direction in which the protective film layer 110 of the polarizing plate 100 faces the guide unit 200.

Because the polarizing plate 100 may be actually moved on the transport facility 1 in the first direction or the second direction, the experimental device according to the present invention is also configured such that while the polarizing plate providing unit 300 is moved in the vertical direction from a reference position P, the polarizing plate 100 may be moved on the guide unit 200 in the first direction or the second direction.

Step (d): Measuring frictional force applied between polarizing plate and guide unit while moving polarizing plate (S400)

Step (d) is a step of measuring frictional force applied between the polarizing plate 100 and the guide unit 200 while moving the polarizing plate 100. The frictional force applied between the polarizing plate 100 and the guide unit 200 is measured while the polarizing plate 100 moves on the guide unit 200 from the moment when the polarizing plate 100 adjoins the guide unit 200.

The measurement of the frictional force is performed in accordance with the movement direction of the polarizing plate 100. Hereinafter, the frictional force measured when the polarizing plate 100 moves in the first direction is referred to as 'A', and the frictional force measured when the polarizing plate 100 moves in the second direction is referred to as 'B'.

In this experiment, a texture analyzer (TA XT PLUS) is used to measure the frictional force. Specifically, the texture analyzer (TA XT PLUS) is installed on the polarizing plate providing unit 300, and force applied to the texture analyzer (TA XT PLUS) is measured when the polarizing plate providing unit 300 is moved at a movement speed of 300 mm/min.

The unit of the value of the frictional force measured in the experiment is gf/cm.

Step (e): Deriving condition for appropriately cutting the polarizing plate based on measured value of frictional force and adhesive agent leakage determination criterion set in advance to information about data of frictional force (S500)

Step (e) is a step of deriving the condition for appropriately cutting the polarizing plate based on the value of frictional force measured in step (d) and the adhesive agent leakage determination criterion set in advance to information about the data of frictional force.

The adhesive agent leakage determination criterion is derived from the values of frictional force measured in accordance with the movement direction of the polarizing plate 100 under different conditions of the taper angle θ and the size (c) of the curl. According to the determination criterion, the adhesive agent 151 does not leak when a difference (|A−B|) between the frictional force measured in accordance with the movement direction of the polarizing plate 100 satisfies the following Expression 1:

$$0 < |A - B| \leq 20. \quad \text{<Expression 1>}$$

In addition, according to the data of frictional force set in advance to information, the degree of leakage of the adhesive agent 151 is in proportion to the difference (|A−B|) between the frictional force. Therefore, as the difference (|A−B|) between the values of the frictional force is increased, the amount of the leaking adhesive agent 151 is increased in the corresponding condition when the polarizing plate 100 is moved.

Meanwhile, the determination criterion is made by applying a difference in contact frictional force applied between the guide unit 200 and the polarizing plate 100 in accordance with the movement direction of the polarizing plate 100.

This step may include calculating a difference between the frictional force measured while the polarizing plate 100 moves in the first direction and the frictional force measured while the polarizing plate 100 moves in the second direction and comparing the difference with the determination criterion in accordance with Expression 1.

In addition, this step may derive the condition for appropriately cutting the polarizing plate 100 from the cutting condition when based on the determination criterion and the calculated difference between the frictional force, it is determined that the adhesive agent 151 does not leak from the polarizing plate 100.

Hereinafter, a process of deriving the condition for appropriately cutting the polarizing plate 100 based on the adhesive agent leakage determination criterion set in advance to information about the data of frictional force will be described.

Figure 5:
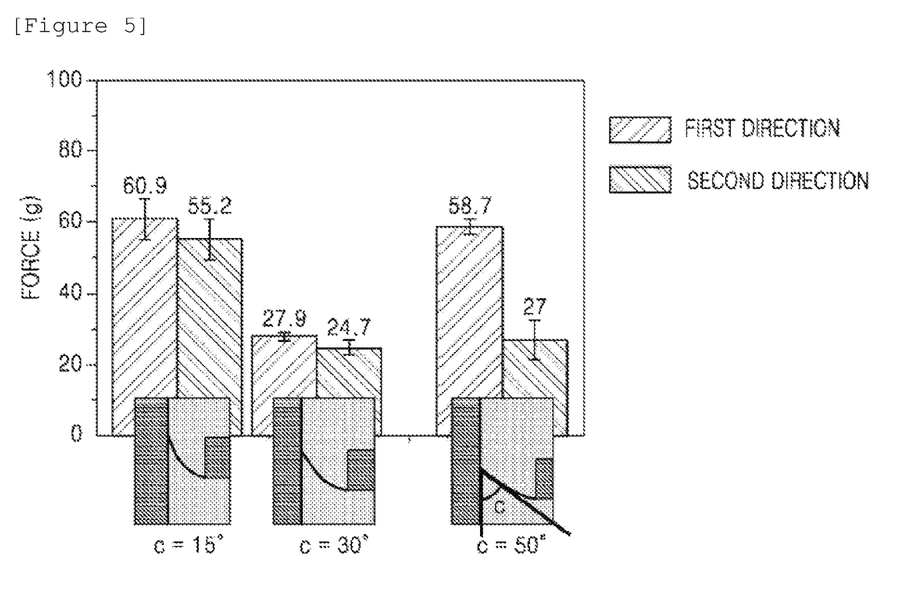
FIG. 5 is a graph of the measured frictional force applied between the polarizing plate and a guide unit in accordance with a movement direction of the polarizing plate as a function of curl size of the polarizing plate.

FIG. 5 is a graph showing the result of measuring frictional force applied between the polarizing plate and a guide unit in accordance with a movement direction of the polarizing plate is illustrated with respect to size conditions of curls of the same polarizing plate.

Specifically, FIG. 5 is a graph showing the result of measuring a value of frictional force while adjusting the size (c) of the curl to 15°, 30°, and 50° when the taper angle θ of the polarizing plate 100 is 90°. The experimental results are shown in Table 2.

TABLE 2

| Size (c) of curl | Frictional force (A) during movement in first direction | Frictional force (B) during movement in second direction | Difference in frictional force (|A − B|) | Whether appropriate cutting condition is made |
|---|---|---|---|---|
| 15 | 60.9 | 55.2 | 5.7 | ◯ |
| 30 | 27.9 | 24.7 | 5.2 | ◯ |
| 50 | 58.7 | 27 | 31.7 | X |

As shown in Table 2, whether the appropriate cutting condition is made may vary depending on the size (c) of the curl even though the polarizing plate 100 is formed under the same cutting condition. It can be determined based on the determination criterion that the adhesive agent 151 does not leak when the taper angle θ of the polarizing plate 100 is 90° and the size (c) of the curl is 15° or 30°. The adhesive agent 151 leaks when the size (c) of the curl is 50°. In this case, the condition that does not cause leakage of the adhesive agent 151 may correspond to the appropriate cutting condition according to this exemplary embodiment.

That is, the polarizing plate 100 may be cut so that the cut surface 170 of the polarizing plate 100 has a taper angle θ of 90° when the size (c) of the curl is 15° or 30° in accordance with the distance between the guide unit 200 and the clamp 310 in the transport facility 1.

Figure 7A:
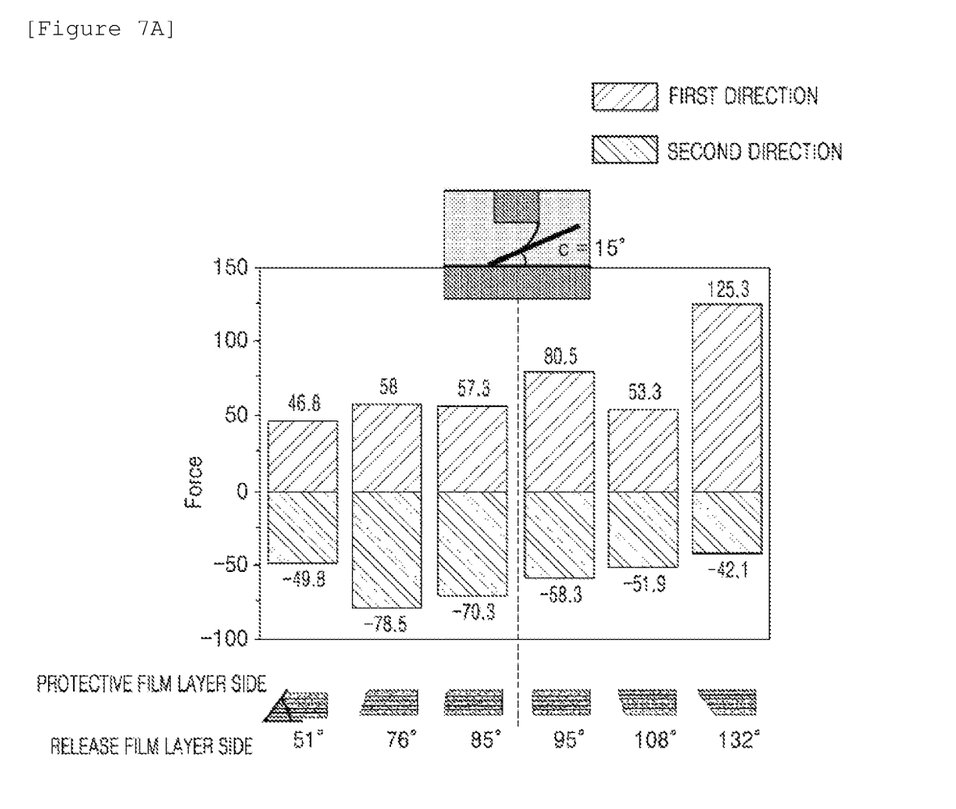
FIGS. 7A to 7C are graphs of the measured frictional force applied between the polarizing plate and the guide unit in accordance with the movement direction of the polarizing plate as a function of curl size of the polarizing plate and the various shapes of the cut surfaces of the polarizing plate.
Figure 7B:
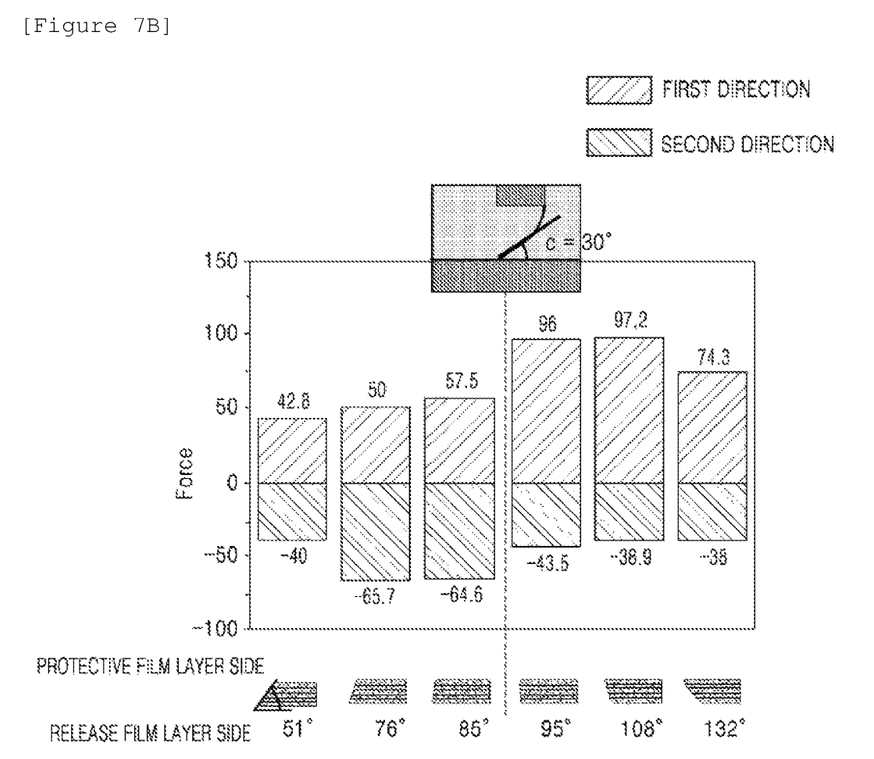
Figure 7C:
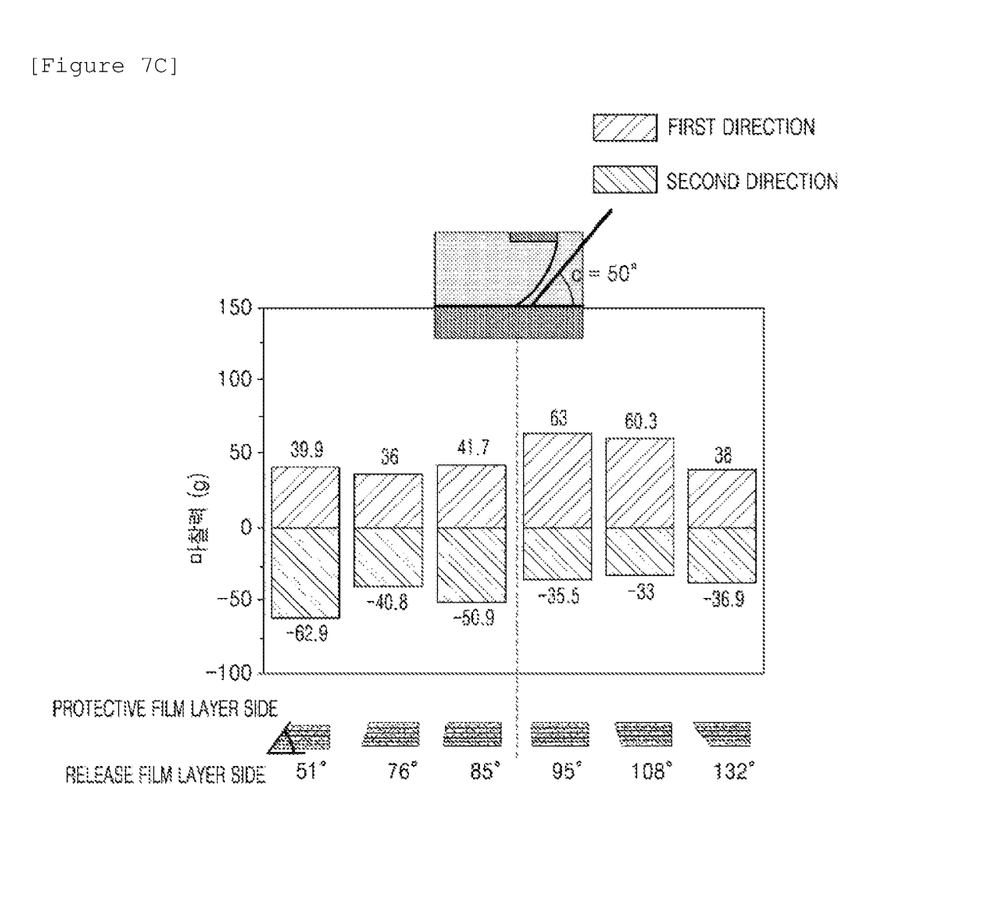
Figure 8:
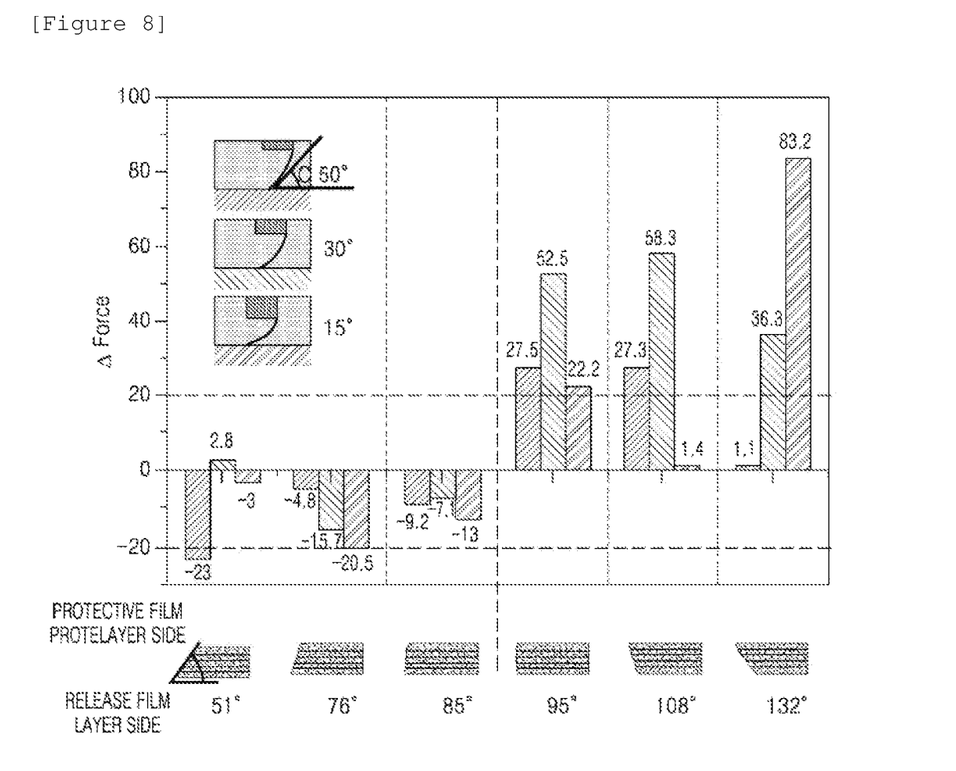
FIG. 8 is a graph illustrating the measurement results of FIGS. 7A to 7C as a difference between measured values of the frictional force in accordance with the movement direction of the polarizing plate.
Figure 10:
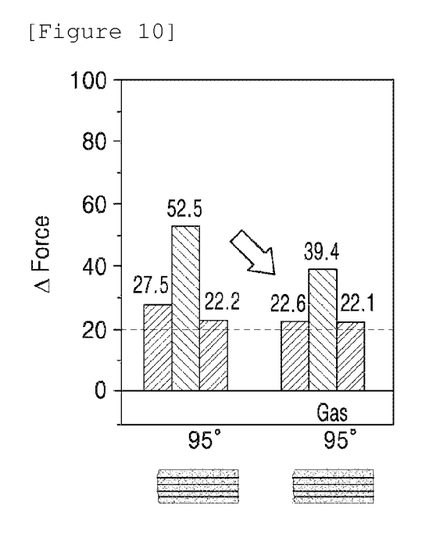
FIG. 10 is a graph showing a change in measured value of frictional force with respect to a change in auxiliary gas and a change in lower end suction pressure when the polarizing plate is cut.

FIGS. 7A to 7C are graphs corresponding to experimental examples according to the present invention, in which results of measuring frictional force applied between the polarizing plate and the guide unit in accordance with the movement direction of the polarizing plate are illustrated with respect to size conditions of the curls of the polarizing plate and shape conditions of the cut surfaces of the polarizing plate. FIG. 8 is a graph showing the measurement results in FIGS. 7A to 7C as a difference between measured values of the frictional force in accordance with the movement direction of the polarizing plate, and FIG. 10 is a graph showing a change in frictional force with respect to a change in auxiliary gas and a change in lower end suction pressure when the polarizing plate is cut.

FIGS. 7A to 7C are graphs showing the results of measuring values of the frictional force while adjusting the size (c) of the curl to 15°, 30°, and 50° when the multiple polarizing plates 100 have different taper angles θ, and the experimental results may be ascertained from the data in FIG. 8 and the following Tables 3 to 5.

TABLE 3

Size (c) of curl - 15°

| Taper angle θ | Frictional force (A) during movement in first direction | Frictional force (B) during movement in second direction | Difference in frictional force (\|A − B\|) | Whether appropriate cutting condition is made |
|---|---|---|---|---|
| 51 | 46.8 | 49.8 | 3 | ○ |
| 76 | 58 | 78.5 | 20.5 | X |
| 85 | 57.3 | 70.3 | 13 | ○ |
| 95 | 80.5 | 58.3 | 22.2 | X |
| 108 | 53.3 | 51.9 | 1.4 | ○ |
| 132 | 125.3 | 42.1 | 83.2 | X |

As shown in Table 3, the adhesive agent 151 did not leak when the taper angle θ was 51°, 85°, or 108° based on the determination criterion when the size (c) of the curl is 15° in accordance with the distance between the guide unit 200 and the clamp 310 in the transport facility 1. Therefore, the cutting condition, in which the size (c) of the curl is 15° and the taper angle θ is 51°, 85°, or 108°, may be the condition for appropriately cutting the polarizing plate. The laser irradiation may be performed from the protective film layer 110 to the release film layer 160 when the taper angle θ is 51° or 85°, or the laser irradiation may be performed from the release film layer 160 to the protective film layer 110 when the taper angle θ is 108°. However, the laser irradiation angle needs to be appropriately adjusted because the appropriate cutting condition may not be made in accordance with the taper angle θ even though the laser irradiation is performed in the same direction.

TABLE 4

Size (c) of curl - 30°

| Taper angle θ | Frictional force (A) during movement in first direction | Frictional force (B) during movement in second direction | Difference in frictional force (\|A − B\|) | Whether appropriate cutting condition is made |
|---|---|---|---|---|
| 51 | 42.8 | 40 | 2.8 | ○ |
| 76 | 50 | 65.7 | 15.7 | ○ |
| 85 | 57.5 | 64.6 | 7.1 | ○ |
| 95 | 96 | 43.5 | 52.5 | X |
| 108 | 97.2 | 38.9 | 58.3 | X |
| 132 | 74.3 | 38 | 36.3 | X |

As shown in Table 4, the adhesive agent 151 did not leak when the taper angle θ was 51°, 76°, or 85° based on the determination criterion when the size (c) of the curl is 30° in accordance with the distance between the guide unit 200 and the clamp 310 in the transport facility 1. Therefore, the cutting condition, in which the size (c) of the curl is 30° and the taper angle θ is 51°, 76°, or 85°, may be the condition for appropriately cutting the polarizing plate. The laser irradiation direction is equally set from the protective film layer 110 to the release film layer 160 when the taper angle θ is 51°, 76°, or 85°, and there may be some differences between the laser irradiation angles for forming the taper angles θ.

TABLE 5

Size (c) of curl - 50°

| Taper angle θ | Frictional force (A) during movement in first direction | Frictional force (B) during movement in second direction | Difference in frictional force (\|A − B\|) | Whether appropriate cutting condition is made |
|---|---|---|---|---|
| 51 | 39.9 | 62.9 | 23 | X |
| 76 | 36 | 40.8 | 4.8 | ○ |
| 85 | 41.7 | 50.9 | 9.2 | ○ |
| 95 | 63 | 35.5 | 27.5 | X |
| 108 | 60.3 | 33 | 27.3 | X |
| 132 | 38 | 36.9 | 1.1 | ○ |

As shown in Table 5, the adhesive agent 151 did not leak when the taper angle θ was 76°, 85°, or 132° based on the determination criterion when the size (c) of the curl is 50° in accordance with the distance between the guide unit 200 and the clamp 310 in the transport facility 1. Therefore, the cutting condition, in which the size (c) of the curl is 50° and the taper angle θ is 76°, 85°, or 132°, may be the condition for appropriately cutting the polarizing plate. The laser irradiation may be performed from the protective film layer 110 to the release film layer 160 and the cutting may be performed while changing the laser irradiation angle when the taper angle θ is 76° or 85°, or the laser irradiation may be performed from the release film layer 160 to the protective film layer 110 when the taper angle θ is 132°.

Meanwhile, when it is difficult to change the laser irradiation direction, the auxiliary gas and the lower end suction pressure are increased when cutting the polarizing plate, such that it is possible to cut the polarizing plate while preventing leakage of the adhesive agent 151. The thickness of the adhesive layer 150 exposed through the cut surface 170 is decreased as the auxiliary gas and the lower end suction pressure are increased when the laser cutting is performed, such that it is possible to reduce a degree of leakage of the adhesive agent 151. As shown in FIG. 10, the degree of leakage of the adhesive agent is reduced when the auxiliary gas is used to cut the polarizing plate and the taper angle θ is 95° in comparison with the case in which the auxiliary gas is not used.

As described above, according to the method of deriving a condition for appropriately cutting a polarizing plate according to an exemplary embodiment of the present invention, a manner of cutting the polarizing plate 100 and a shape of the cut surface 170 are adjusted based on the determination criterion in respect to leakage of the adhesive agent 151 set in advance to information about data of frictional force applied between the polarizing plate 100 and the guide unit 200, and as a result, it is possible to minimize leakage of the adhesive agent 151 when the polarizing plate 100 is transported.

While the present invention has been described with reference to the aforementioned exemplary embodiments, various modifications or alterations may be made without departing from the subject matter and the scope of the invention. Accordingly, the appended claims include the modifications or alterations as long as the modifications or alterations fall within the subject matter of the present invention.

The invention claimed is:

1. A method of deriving an appropriate cutting condition for cutting a polarizing plate, the method comprising:

(a) preparing a polarizing plate including an adhesive layer, wherein the polarizing plate has a cut surface;
(b) providing the polarizing plate so that one end of the polarizing plate adjoins a guide unit;
(c) moving the polarizing plate on the guide unit;
(d) measuring frictional force applied between the polarizing plate and the guide unit while moving the polarizing plate; and
(e) deriving the appropriate cutting condition for cutting the polarizing plate based on the measured value of the frictional force and a predetermined adhesive agent leakage determination criterion based on the frictional force.

2. The method of claim 1, wherein the appropriate cutting condition includes a cutting angle formed between one of two surfaces of the polarizing plate and the cut surface of the polarizing plate.

3. The method of claim 1, wherein step (b) includes adjusting a size of a curl formed at one end of the polarizing plate.

4. The method of claim 1, wherein a protective film layer is positioned on one of two surfaces of the polarizing plate, and a release film layer is positioned on the other of the two surfaces of the polarizing plate.

5. The method of claim 1, wherein step (c) moves the polarizing plate in a first direction toward which one of two surfaces of the polarizing plate is directed or a second direction toward which the other of the two surfaces of the polarizing plate is directed.

6. The method of claim 5, wherein step (e) includes calculating a difference between a frictional force measured when the polarizing plate moves in the first direction and a frictional force measured when the polarizing plate moves in the second direction and comparing the difference with the determination criterion.

7. The method of claim 6, wherein step (e) derives the appropriate cutting condition for cutting the polarizing plate when it is determined that the adhesive agent does not leak from the polarizing plate based on the calculated difference between the values of the frictional force and the determination criterion.

* * * * *